United States Patent [19]
Flood et al.

[11] Patent Number: 5,921,509
[45] Date of Patent: Jul. 13, 1999

[54] APPARATUS FOR SUSPENDING CONDUIT

[75] Inventors: Timothy E. Flood, Kennesaw; Anthony J. Carmen, Roswell; John P. Graham, Flowery Branch, all of Ga.

[73] Assignee: Americon International Corporation, Stone Mountain, Ga.

[21] Appl. No.: 08/888,078

[22] Filed: Jul. 3, 1997

[51] Int. Cl.⁶ .................................................. E21F 17/02
[52] U.S. Cl. ............................. 248/58; 248/65; 248/68.1
[58] Field of Search .............................. 248/558, 49, 58, 248/59, 62, 65, 68.1, 317

[56] References Cited

U.S. PATENT DOCUMENTS

| | | |
|---|---|---|
| Re. 35,344 | 10/1996 | Fry et al. . |
| 448,550 | 3/1891 | Scott ......................................... 248/65 |
| 535,707 | 3/1895 | MacTaggart .......................... 248/62 X |
| 868,694 | 10/1907 | Parks ......................................... 248/58 |
| 1,596,317 | 8/1926 | Skinner ..................................... 248/59 |
| 3,196,764 | 7/1965 | Grieder . |
| 3,228,639 | 1/1966 | Korns ....................................... 248/62 |
| 3,695,563 | 10/1972 | Evans ................................... 248/58 X |
| 4,093,818 | 6/1978 | Thwaites et al. . |
| 4,442,990 | 4/1984 | Krueger ................................... 248/62 |
| 4,618,114 | 10/1986 | McFarland ................................ 248/65 |
| 5,199,239 | 4/1993 | Younger . |
| 5,573,210 | 11/1996 | Hendrix et al. ........................... 248/59 |
| 5,730,399 | 3/1998 | Baginski ................................... 248/58 |

*Primary Examiner*—Derek J. Berger
*Attorney, Agent, or Firm*—Thomas, Kayden, Horstemeyer & Risley

[57] ABSTRACT

The invention comprises an apparatus for suspending conduit from a solid support structure (e.g., a bridge) which includes a plurality of hanger elements arranged and configured for interconnection to form a horizontally or vertically extending array of cells. Each cell includes a size and shape adapted to support an individual conduit. Support rods extend from the solid support structure to support the hanger elements. The support rods may include a first end anchored into the solid support structure and a threaded second end adapted to retain threaded nuts and washers, or the like. In one embodiment, the invention comprises a J-shaped hanger element having an upright support leg with first and second ends and a conduit support bar extending laterally from the second end of the upright support leg. The conduit support bar includes a first end connected to the upright support member and a second end which may receive various attaching and connecting devices.

28 Claims, 3 Drawing Sheets

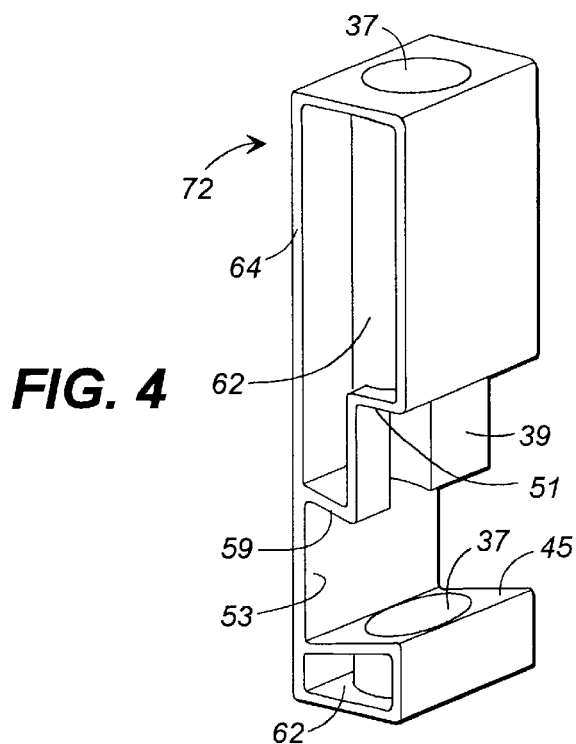
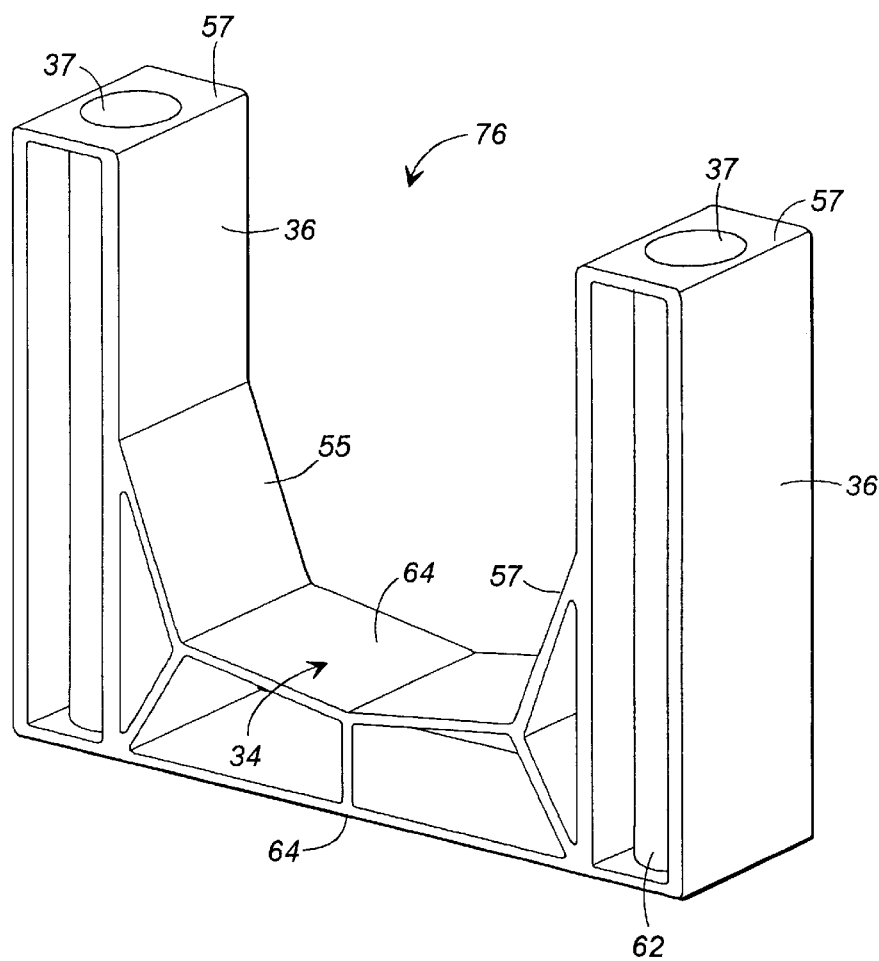

APPARATUS FOR SUSPENDING CONDUIT

FIELD OF THE INVENTION

The present invention generally relates to devices for supporting conduit, and more particularly to an apparatus for supporting one or a plurality of conduit from a solid support such as a bridge.

BACKGROUND OF THE INVENTION

Many devices exist which suspend conduits from solid structures. FIG. 1 illustrates one such prior art device 10. Device 10 includes threaded support rods 12 and 13 having upper ends secured within a solid support structure such as a bridge or viaduct (not shown) and lower ends which receive various portions of the device 10. More specifically, support rods 12 and 13 receive nuts 24 and 25 thereon. Additionally, threaded support rods 12 and 13 receive lock nuts 6 and 8 and washers 22 and 23 to provide an upper barrier to the other components of the apparatus 10. Threaded support rods 12 and 13 also receive a top bar 26, which provides a top barrier to conduit 28. Support rods also receive space sleeves 19 and 20, respectively, and bottom conduit support plate 18, which provides a support surface for conduit 28. Finally, threaded support rods 12 and 13 receive nuts 14 and 15, lock washers 2 and 4, and washers 16 and 17 to retain conduit support plate 18 on support rods 12 and 13, and to provide a compressive force between plate 26, spacers 19 and 20, and plate 18 so as to provide a secure space for the conduit 28.

Hanging devices of the type described above have many disadvantages. For example, the excessive number of parts associated therewith make those devices very cumbersome and time consuming to install. Furthermore, if spacers between upper and lower engagement members are not of the proper length, tightening nuts may crush the conduit arranged between the engagement members, damaging contents within the conduit. Furthermore, flat surfaces associated with top and bottom support members provide very little engagement surface area and tend to deform the outer periphery of the conduit to form flat portions thereon, possibly damaging contents therein. Additionally, devices of the type described above are not adapted to hang a plurality of conduits and are not interlockable with other similar units. Finally, since all components of such devices usually are constructed from metallic materials, the components are heavy, expensive, and prone to corrosion and tend to degrade an outer sheath of the conduit.

With the forgoing disadvantages of the prior art in mind, it is an object of the present invention to provide a modular apparatus for suspending conduit from a solid support such as a bridge.

It is a further object of the present invention to provide an apparatus for suspending conduit that may include similar elements which are capable of easily interlocking to form an array of cells, wherein each cell is sized and shaped to contain a conduit.

It is another object of the present invention to provide a conduit hanging device which does not deform an outer sheath of a conduit.

It is another object of the present invention to provide a conduit hanging device which is corrosion resistant and which does not degrade the conduit which is supported by the hanging device.

It is another object to provide a conduit hanging device which is resistant to degradation from ultraviolet (UV) light.

Other objects, features and advantages of the present invention will become apparent upon reading the following specification, when taken in conjunction with the accompanying drawings.

SUMMARY OF THE INVENTION

Generally speaking, the invention comprises an apparatus for suspending conduit from a solid support structure (e.g., a bridge) which includes a plurality of hanger elements arranged and configured for interconnection to form a horizontally or vertically extending array of cells. Each cell includes a size and shape adapted to support an individual conduit. Support rods extend from the solid support structure to support the hanger elements. The support rods may include a first end anchored into the solid support structure and a threaded second end adapted to retain threaded nuts and washers, or the like.

In one embodiment, the invention comprises a J-shaped hanger element having an upright support leg with first and second ends and a conduit support bar extending laterally from the second end of the upright support leg. The conduit support bar includes a first end connected to the upright support member and a second end which may receive various attaching and connecting means as discussed below.

The upright support leg of each J-shaped hanger element may include attaching means for attaching the J-shaped hanger element to the support structure. Although any attaching means may be utilized, in a preferred embodiment the attaching means includes an open-ended passageway formed through a portion thereof. The open-ended passage way generally receives a second end of a support rod to provide support to the J-shaped hanger element from the solid structure. Although the open-ended passageway may be formed in any portion of the upright support leg, a preferred embodiment of the present invention generally requires the passageway to be concentric with a geometrical longitudinal centerline of the upright support leg. The attachment means may also include an open-ended passageway formed through a portion of the conduit support bar second end for receiving a second end of a support rod to provide further support to the J-shaped hanger element from the solid structure. Finally, the attaching means may also include threads on the second end of each support rod adapted to receive a plurality of lock nuts for threading thereon. In that embodiment, the lock nuts retain the J-shaped hanger element on the support rod.

The inventive apparatus may also include an upright element having a first end attached to the support structure, and a second end connected to a J-shaped hanger element for providing further support to an open-ended portion of the J-shaped hanger element. For example, an upright element may include, but is not limited to another J-shaped hanger element to form a U-shaped opening, wherein the U-shaped opening is defined by two upright support legs of adjacent J-shaped hanger elements and the conduit support bar of the first J-shaped hanger element. In another example, the upright element may include a longitudinal lock bar extending from the support structure to the conduit support bar second end. Where a lock bar is utilized, the J-shaped hanger element and the lock bar define the U-shaped opening an upright support legs and the conduit support bar of a J-shaped hanger element, and the and the bar. In each case, the U-shaped opening is sized and shaped to receive the conduit.

The lock bar may also include attaching means for attaching it to the support structure. In a preferred embodiment, attaching means on the lock bar may include an open-ended passageway formed in a portion thereof for receiving a second end of a connecting rod.

The present invention also includes a connecting means for connecting the J-shaped hanger element to another upright element. Nearly any known connecting means may be utilized, but a preferred embodiment includes a recess at one of the conduit support bar second end and the upright support element second end, and a protrusion complementary in shape to the recess formed on the other of the conduit support bar second end and the upright support element second end.

Other embodiments of the present invention envision one support rod supporting at least two J-shaped hanger elements in tandem. In that embodiment, both the attaching and connecting means may cooperate to form a grid of J-shaped hanger elements connected in tandem and laterally to create a matrix of U-shaped opening which are each adapted to hold a separate conduit. Alternatively, each U-shaped opening may be adapted to hold several conduits therein. Furthermore, the J-shaped hanger element may be arranged horizontally, vertically or at any orientation to accomplish the purposes of the present invention. Additionally, each conduit support bar may include an upper supporting surface that is V-shaped to facilitate stabilizing of the conduit on the J-shaped member and for preventing the supporting surface from deforming a surface of the conduit by providing extra contact surface area. Furthermore, a lock bar and a J-shaped hanger element may be combined to form a single unitary piece having a U-shaped center portion which is sized and shaped to hold a conduit therein. Alternatively, a top bar can be connected to the assembly over a horizontal row of J-shaped elements so as to enclose each cell. The J-shaped hanger member, lock bar, top bar and U-shaped element may be constructed from any material which is relatively light, stiff and capable of withstanding the elements of weather and road chemicals. Those materials may include, but are not limited to corrosion resistant alloys or high performance polymers. In a preferred embodiment, the J-shaped hanger element, lock bar, top bar and U-shaped elements are formed from an injection molded short fiber-reinforced or pultruded polymer.

BRIEF DESCRIPTION OF THE DRAWINGS

The accompanying drawings incorporated in and forming a part of the specification illustrate several aspects of the present invention, and together with the description serve to explain the principles of the invention. In the drawings like numerals illustrate like parts throughout the several views.

FIG. 4 is a perspective view of a lock bar according to the present invention.

FIG. 5 is a perspective view of an alternative embodiment of a conduit support according to the present invention.

Figure 1:
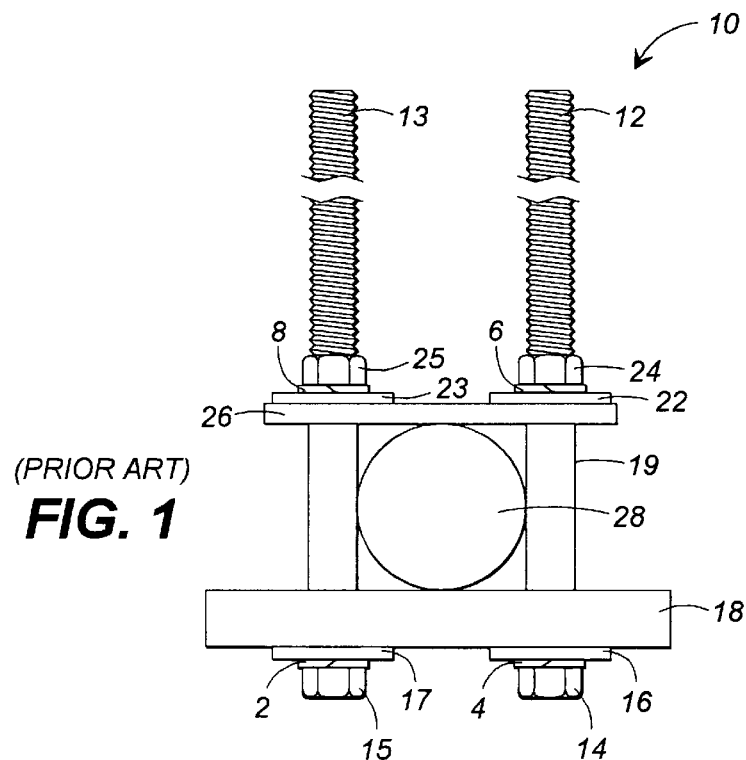
FIG. 1 is a front plan view of a prior art conduit support assembly.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENTS

Figure 2:
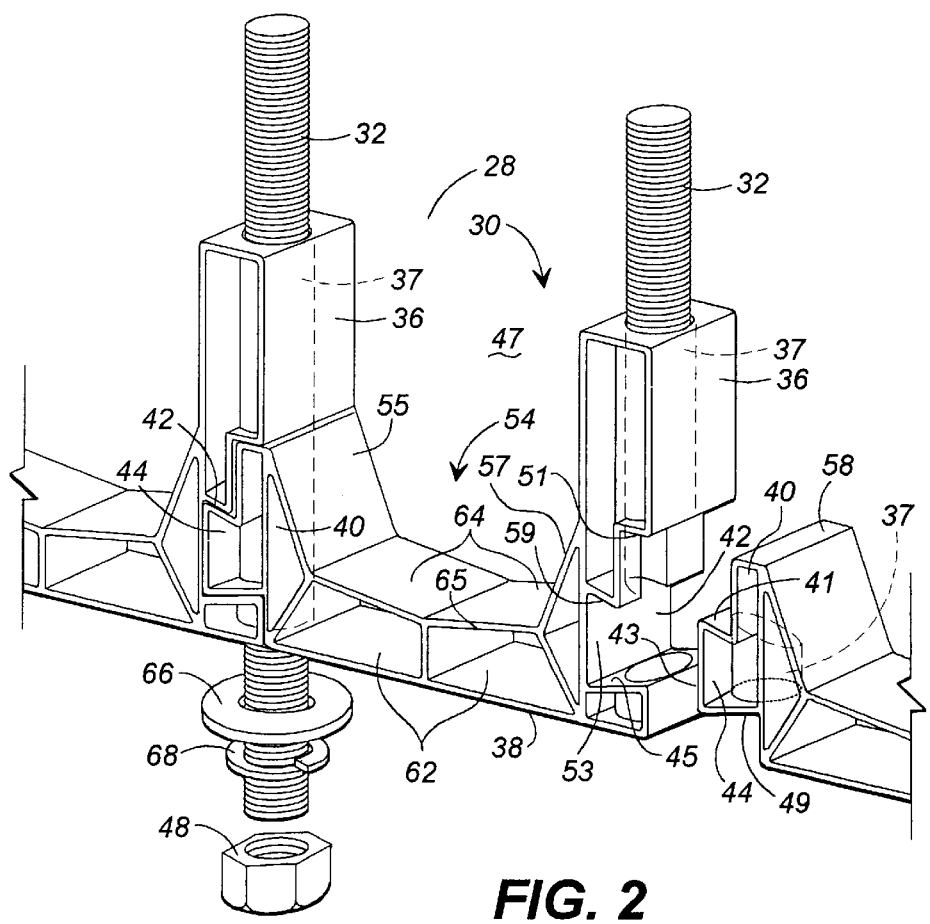
FIG. 2 is a perspective view of the apparatus of the present invention, showing the method of assembly.

FIG. 2 illustrates a perspective view a preferred embodiment of an apparatus 30 for supporting conduit in accordance with the present invention. A plurality of threaded support rods 32, which are fixed in a solid support structure, such as a bridge or highway viaduct (not shown), suspend the apparatus 30. For example, as described above in the discussion of the background of the invention, fresh concrete poured within the foundation of a bridge or viaduct during construction may receive one end of support rods 32 therein to secure fix and support the support rods after the concrete has cured. Alternatively, the bridge or other solid support may be built with appropriately spaced holes with lead inserts to receive the support rods securely therein. Lower ends of the rods extend from the support structure and washers 66, lock washers 68 and lock nuts 48 retain the apparatus 30 thereon.

As discussed above, apparatus 30 may be comprised of one or more J-shaped hanger elements 34 that may individually support conduit 28 or may interlock to form a network of individual conduit supporting cells. In a preferred embodiment, J-shaped elements 34 form the hanger elements and include an upright support leg 36, a conduit support bar 38 extending laterally from the support leg 36 and an upright locking leg 40 extending upward from the conduit support bar 38. Conduit support bar 38 includes a V-shaped conduit support surface 64 which centers and supports a conduit thereon. The V-shape of conduit support surface 64 also increases the amount of surface area which contacts the conduit 28, which spreads an upward support force imparted thereon over a greater area, thereby mitigating any surface deformation occurring as a result of conduit contact with supporting surface 64. Additionally, the supporting surfaces of laterally extending conduit support bars 38 have outer sloping surfaces 55 and 57 in addition to the central V-shaped surface 64. As discussed above, surfaces 55, 57 and 64 dissipate the conduit weight so as to preclude conduit deformation.

A lower portion of upright support legs 36 includes locking recesses 42. Surfaces 45, 53 and 59 define an outer periphery each of locking recess 42. Additionally, lower portions of upright locking legs 40 include a locking protrusion 44 which is complementary in shape to locking recess 42. In the preferred embodiment, protrusions 44 are trapezoidal in shape, wherein surface 43 forms the base of the trapezoid and surfaces 41 and 49 converge behind surface 43. Locking recesses 42 are likewise trapezoidal, wherein surface 53 forms the base of the trapezoidal shape and surfaces 45 and 59 converge in front of surface 53. Surfaces 45 and 59 of locking recesses 42, mate with surfaces 41 and 49, respectively, on locking protrusions 44 on upright locking legs 40. Upright locking legs 40, upright support leg 36 and portions of protrusions 44 include open-ended passageways or bores 37 therethrough for receiving lower ends of the support rods 32 when the J-shaped elements support conduits are in an interlocked state. Finally, each of the J-shaped hanger elements 34 includes a web-like structure. For example, conduit support bar 38 includes webs 62 in a portion thereof and plate-like portions 65 which form portions of the outer peripheries of the J-shaped hanger elements. That configuration provides added stiffness to each element of the apparatus 30 while saving on the amount of material required for forming each of the elements.

J-shaped elements 34 interlock and likewise disengage through a front-to-back sliding motion between the locking protrusion 44 of hanger element 34 and locking recess 42 of hanger elements 34. The attached J-shaped elements 34 thus define a three sided open topped cell 47 defined by two upright support arms 34 and a lateral conduit support bar 38. As discussed above, each upright support leg 36 has an open-ended passageway or bore 37 therethrough as does each upright locking leg 40. When adjacent J-shaped hanger elements 34 interlock via locking together protrusion 44 and recess 42, the bore 37 of upright support leg 36 aligns with the bore 37 of an upright locking leg 40 on the adjacent J-shaped hanger element 34 to allow a threaded support rod 32 to pass therethrough. In that way, support rods 32 support interlocking J-shaped hanger elements 34. As discussed above, the second end of rods 32 receive lock nuts 48, lock washers 68 and washers 66 to retain the hanger elements 34 thereon.

Figure 3:
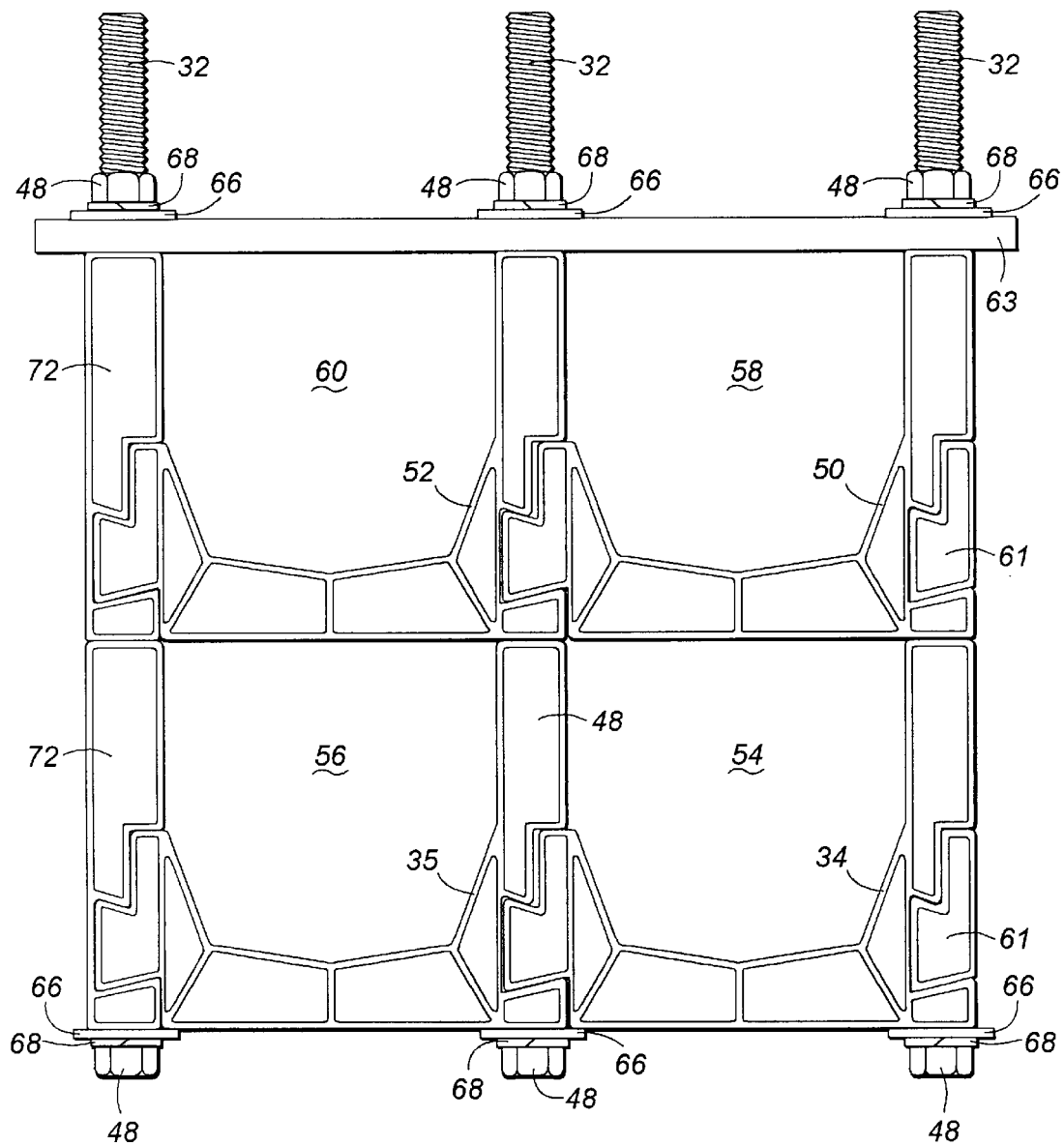
FIG. 3 is a front plan view of the assembled apparatus according to the present invention.

In accordance with another aspect of the present invention, two or more hanger elements may interlock to form a plurality of cells or conduit channels. Additionally, the elements can be assembled horizontally as well as vertically. FIG. 3 illustrates four J-shaped elements 34, 35, 50, 52 assembled to form four cells 54, 56, 58, 60. The third side of cells 56 and 60 are formed by lock bars 72. FIG. 4 illustrates a perspective view of a lock bar 72, which includes an open-ended passageway or bore 37 passing through top and bottom portions thereof, surfaces 39 and 51 which mate with 39 and 57 of upright locking leg 40, surfaces 59, 53, and 45 of locking recess 42 which mate with surfaces 41, 43 and 49 of a protrusion 44 on an adjacent hanger element 34 (see FIG. 3), web portions 63 and plate-like portions 64. Referring back to FIG. 3, lock bars 72 complete a left side of the array of elements 34, 35, 50 and 52. The since lock bars 72 include the bores 37 which allow the support bars 32 to pass therethrough, lock bars 72 provide structural stability to the entire array. Finally, the array of elements may also include spacer elements 61 to fill the locking recesses 42 which do not receive locking protrusions 44 from adjacent J-shaped hanger elements. Thus, spacer elements 61 also stiffen the array of hanger elements so as to reduce deformation resulting from empty locking recesses.

As illustrated in FIG. 3, the horizontally adjoined elements form an array through a stacking arrangement to form a plurality of closed cells. The invention may also include a top rod or cross piece 63 having a series of bores therein. Top surfaces of upright support legs of the J-shaped hanger elements 34, 35, 50 and 52 and a top surface lock bar 72 contact a bottom surface of cross piece 63 so as to form the top edge of the uppermost closed cells. Threaded lock nuts 48 and lock washers 68 along with washers 66 disposed on top portions of rods 32 impart a compressive force to the array of J-shaped elements to solidify or provide rigidity to the array of J-shaped elements.

FIG. 5 illustrates a second embodiment of the present invention which supports a single conduit. Element 76 is U-shaped and includes two upright support legs 36 connected by a laterally extending conduit support leg 34. In a manner similar to that of the J-shaped hanger elements 34, U-shaped element 76 includes a conduit support surfaces 64, 55 and 57 on the conduit support leg 34, wherein inner surface 64 is V-shaped and surfaces 55 and 57 impart lateral stability to a conduit received with the U-shaped element. Upright support legs 36 include open-ended passageways 37 therethrough to receive two support rods 32. The elements can be stacked vertically onto support rods and fastened onto the support rods using washers, lock washers and lock nuts in the manner described above.

The J-shaped elements and lock bars are preferably injection molded from 30% glass fiber filled polypropylene or NYLON. The material may also include additives to resist degradation from ultraviolet (UV) light exposure. The elements may also be of any size so as to form cells of various widths and heights, depending upon the diameter of the conduit to be supported thereby. However, the present industry standard calls for one inch separation between adjacent conduits and standard outside diameter conduit size is approximately 4.5 inches. Thus, a practical size for the elements is 5.69 inches in height and width (not including the locking protrusion). Preferably, all pieces are about 1.5 inches in depth.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for supporting conduit from a support structure, said apparatus comprising:

a first support rod having a first end configured for attaching to a support structure and a second end configured for extending from a support structure;

first and second J-shaped hanger elements each having an upright support leg with first and second ends, and a conduit support bar extending from each of said second ends of said upright support legs, said conduit support bars each having a first end connected to said upright support leg and a second end;

an open-ended passageway formed through said upright support leg of said first J-shaped hanger element for receiving said second end of said first support rod to provide support to said first J-shaped hanger element; and first connecting means for connecting said second end of said conduit support bar of said first J-shaped hanger element to said upright support leg of said second J-shaped hanger element to form a first U-shaped opening, said first U-shaped opening defined by said upright support legs of said first and second J-shaped hanger elements and said conduit support bar of said first J-shaped hanger element, wherein said first U-shaped opening is sized and shaped to receive at least one conduit.

2. The apparatus of claim 1, wherein said first connecting means comprises:

a first recess arranged at said second end of said upright support leg of said first J-shaped hanger element; and a first protrusion arranged at said second end of said conduit support bar, said first protrusion complementary in shape to and configured to engage said first recess arranged at said second end of said upright support leg of said second J-shaped hanger element.

3. The apparatus of claim 1, further comprising:

a second support rod having a first end configured for attaching to a support structure and a second end configured for extending from the support structure;

a lock bar having a first end, a second end and an open-ended passageway formed through at least a portion thereof for receiving said second end of said second support rod; and second connecting means for connecting said second J-shaped hanger element to said second end of said lock bar to form a second U-shaped opening, said second U-shaped opening defined by said upright support leg of said second J-shaped hanger element, said conduit support bar of said second J-shaped hanger element and said lock bar, wherein said second U-shaped opening is sized and shaped to receive at least one conduit.

4. The apparatus of claim 3, wherein said second connecting means comprises:

a second connecting means recess arranged at said second end of said lock bar; and a second connecting means protrusion complementary in shape to and configured to engage said second connecting means recess, said second connecting means protrusion arranged at said second end of said conduit support bar of said second J-shaped hanger element.

5. The apparatus of claim 3, wherein said second end of each of said support rods is externally threaded and further comprising a nut for threading onto said second end of each of said support rods for retaining said J-shaped hanger elements on said support rods.

6. The apparatus of claim 3, wherein said second connecting means further comprises:

a second connecting means recess arranged at said second end of said lock bar; and a second connecting means protrusion complementary in shape to and configured to engage said second connecting means recess arranged at said second end of said conduit support bar of said second J-shaped hanger element.

7. The apparatus of claim 3, further comprising:

a third support rod having a first end configured for attaching to a support structure and a second end configured for extending from the support structure;

said second J-shaped hanger element having an open-ended passageway formed through at least a portion thereof for receiving said second end of said third support rod.

8. The apparatus of claim 1, further comprising:

a third J-shaped hanger element having an upright support leg and an open ended passageway disposed therein, said open ended passageway receiving said second end of said first support rod, thereby said first support rod providing support to said third J-shaped hanger element such that said open ended passageway of said upright support leg of said first J-shaped hanger element and said open ended passageway of said upright support leg of said third J-shaped hanger are axially aligned;

said first J-shaped hanger element and said third J-shaped hanger element being axially adjacent.

9. The apparatus of claim 1, wherein said conduit support bar of said first J-shaped hanger element has an upper supporting surface which is V-shaped for stabilizing a conduit on said first J-shaped member and for preventing said upper supporting surface from deforming the conduit.

10. The apparatus of claim 1, wherein said first J-shaped member is formed from a polymer.

11. The apparatus of claim 1, wherein said first connecting means comprises:

a first recess arranged at said second end of said upright support leg of said second J-shaped hanger element; and a first protrusion complementary in shape to and configured to engage said first recess arranged at said second end of said conduit support bar of said first J-shaped hanger element.

12. The apparatus of claim 10, wherein said polymer is fiber reinforced.

13. An apparatus for supporting conduit from a support structure with a plurality of support rods, wherein each support rod includes a first end attached to the support structure and a second end extending from the support structure, said apparatus comprising:

a first J-shaped hanger element having an upright support leg with first and second ends and a non-cylindrical conduit support bar extending from said second end of said upright support leg, said conduit support bar having a first end connected to said upright support leg and a second end;

an open-ended passageway formed through at least a portion of said upright support leg for receiving a second end of a support rod;

an upright support element having an open-ended passageway formed through at least a portion thereof for receiving a second end of a support rod; and a locking element configured for removably connecting said second end of said conduit support bar of said first J-shaped hanger element to said upright support element, wherein said second end of said conduit support bar includes an open-ended passageway formed through at least a portion thereof for receiving a second end of a support rod, a U-shaped opening defined by said upright support leg of said first J-shaped hanger element, said conduit support bar of said first J-shaped hanger element and said upright support element, wherein said U-shaped opening is sized and shaped to receive at least one conduit.

14. The apparatus of claim 13, wherein said locking element further comprises:

a recess formed in said second end of said upright support element; and wherein said conduit support bar of said first J-shaped hanger element has a protrusion complementary in shape to and configured to engage said recess.

15. The apparatus of claim 14, wherein said protrusion comprises a trapezoidal shape.

16. The apparatus of claim 13, wherein said upright support element comprises:

a second J-shaped hanger element to form said U-shaped opening, and wherein said U-shaped opening is defined by said upright support leg and said conduit support bar of said first J-shaped hanger element and an upright support leg of said second J-shaped hanger.

17. The apparatus of claim 13, wherein said upright support element comprises:

a lock bar having an open-ended passageway formed therethrough for receiving the second end of a support rod, and wherein said U-shaped opening is defined by said upright support leg and said conduit support bar of said first J-shaped hanger element and said lock bar.

18. The apparatus of claim 13, wherein said conduit support bar of said first J-shaped hanger element further comprises:

an upper supporting surface which is V-shaped for stabilizing a conduit on said first J-shaped hanger element and for preventing said supporting surface from deforming the conduit.

19. The apparatus of claim 13, wherein said first J-shaped member is formed from a polymer.

20. The apparatus of claim 19, wherein said polymer is fiber reinforced.

21. The apparatus of claim 13, wherein said locking element further comprises:

a recess formed in said upright support element; and a protrusion complementary in shape to and configured to engage said recess arranged at said second end of said conduit support bar, said open-ended passageway disposed in said protrusion.

22. The apparatus of claim 21, wherein said protrusion comprises a trapezoidal shape.

23. An apparatus for supporting conduit from a support structure, said apparatus comprising:

a first J-shaped hanger element having an upright support leg with first and second ends and a non-cylindrical conduit support bar extending from said second end of said upright support leg, said conduit support bar having a first end connected to said upright support leg and a second end;

an upright support element for supporting said conduit support bar;

first attaching means for attaching said first J-shaped hanger element to a support structure;

second attaching means for attaching said upright support element to a support structure; and connecting means for connecting said first J-shaped hanger element to said upright support element to form a U-shaped opening, said second end of said conduit support bar includes an open-ended passageway formed through at least a portion thereof for receiving a portion of said second attaching means, said U-shaped opening defined by said upright support leg of said first J-shaped hanger element, said conduit support bar of said first J-shaped hanger element and said upright support element, wherein said U-shaped opening is sized and shaped to receive at least one conduit.

24. The apparatus of claim 23, wherein said first attaching means comprises:

a first support rod; and an open-ended passageway formed through at least a portion of said upright support leg for receiving said first support rod.

25. The apparatus of claim 24, wherein said second attaching means further comprises:

a second support rod: and an open-ended passageway formed through at least a portion of said upright support element for receiving second support rod; and wherein said open-ended passageway formed through at least a portion of said conduit support bar receives said second support rod, such that said upright support element is at least partially interposed between said conduit support bar and the support structure when said upright support element and said conduit support bar receive said second support rod.

26. The apparatus of claim 23, wherein the upright support element comprises:

a second J-shaped hanger element, wherein said U-shaped opening is defined by said upright support leg of said first J-shaped hanger element, said conduit support bar of said first J-shaped hanger element and an upright support leg of said second J-shaped hanger element.

27. The apparatus of claim 23, wherein said upright support element comprises:

a lock bar, and wherein said U-shaped opening is defined by said upright support leg of said first J-shaped hanger element, said conduit support bar of said first J-shaped hanger element and said lock bar.

28. Apparatus for hanging conduit from a support structure, comprising:

a plurality of J-shaped hanger elements arranged with each other in connected series for suspending from a support structure, each of said J-shaped hanger elements including:

an upright support leg with an upper end and a lower end, a locking recess formed in said upright support leg between said upper end and said lower end, a conduit support bar having a first end mounted to said lower end of said upright support leg, a second end extending laterally from said lower end of said upright support leg, and a locking element protruding from said second end of said conduit support bar inserted into a locking recess of an adjacent duplicate J-shaped hanger element, said locking recess and said locking element being sized and shaped to lock together adjacent ones of said J-shaped hanger elements, and said upright support leg and said locking element each defining open ended passageways therethrough with said open-ended passageway of said locking element aligned with said open-ended passageway of an adjacent J-shaped hanger element when said locking element is inserted into said locking recess of an adjacent J-shaped hanger element;

a support rod extending vertically through said aligned passageways of said upright support leg and said locking element and having an upper portion for attachment to a support structure and a lower end protruding downwardly beyond said upright support leg;

fastener means connected to said lower end of each support rod holding said upright support leg and said locking element of adjacent ones of said J-shaped elements in position on said support rod; and said upright support legs and conduit support bars of adjacent ones of said J-shaped hanger elements forming U-shaped openings for receiving and supporting conduits.

* * * * *